United States Patent
Holloway et al.

(10) Patent No.: US 6,843,938 B2
(45) Date of Patent: Jan. 18, 2005

(54) METHODS FOR PREPARING RARE-EARTH OXYSULFIDE PHOSPHORS, AND RESULTING MATERIALS

(75) Inventors: Paul H. Holloway, Gainesville, FL (US); Mostafa Abboudi, Tangier (MA)

(73) Assignee: University of Florida Research Foundation, Inc., Gainesville, FL (US)

(*) Notice: Subject to any disclaimer, the term of this patent is extended or adjusted under 35 U.S.C. 154(b) by 0 days.

(21) Appl. No.: 10/388,140

(22) Filed: Mar. 13, 2003

(65) Prior Publication Data

US 2003/0209694 A1 Nov. 13, 2003

Related U.S. Application Data

(60) Provisional application No. 60/364,838, filed on Mar. 13, 2002.

(51) Int. Cl.$^7$ .............................................. C09K 11/84
(52) U.S. Cl. ............................................. 252/301.4 S
(58) Field of Search ................................. 252/301.4 S

(56) References Cited

U.S. PATENT DOCUMENTS

| | | | |
|---|---|---|---|
| 3,878,119 A | | 4/1975 | Nath |
| 3,980,887 A | | 9/1976 | Mattis et al. |
| RE29,662 E | * | 6/1978 | Yocom ................. 252/301.4 S |
| 4,473,518 A | * | 9/1984 | Minagawa et al. ......... 264/667 |
| 4,510,414 A | * | 4/1985 | Fujino et al. ............... 313/468 |
| 5,217,647 A | | 6/1993 | Tono et al. |
| 5,879,587 A | | 3/1999 | Yale |
| 6,103,296 A | * | 8/2000 | McSweeney ................. 427/65 |

FOREIGN PATENT DOCUMENTS

| | | |
|---|---|---|
| EP | 0 471 091 A1 | 2/1992 |
| EP | 471091 * | 2/1992 |
| EP | 0 908 503 A1 | 4/1999 |
| EP | 1 236 784 A | 9/2002 |

OTHER PUBLICATIONS

Chen, Jing–Ran, Maria T. Dunlay, Richard N. Zare (Mar. 15, 2000) "Macroporous Photopolymer Frits for Capillary Electochromatography" *Anal. Chem.* 72(6):1224–1227.

Valaskovic, Gary A. et al. (Oct. 15, 1995) "Attomole–Sensitivity Electrospray Source for Large–Molecule Mass Spectrometry" *Anal. Chem.* 67(20):3802–3805.

* cited by examiner

*Primary Examiner*—C. Melissa Koslow
(74) *Attorney, Agent, or Firm*—Saliwanchik, Lloyd & Saliwanchik

(57) ABSTRACT

The present invention provides new and useful methods for preparing rare-earth oxysulfide phosphors. Advantageously, in accordance with the methods of the subject invention, rare-earth oxysulfide phosphors can be prepared with lower reaction temperatures and fewer processing steps than methods currently in use. In a preferred embodiment, the process of the subject invention involves blending two different rare-earth nitrate salts and a sulfidizing agent. Then, the mixture is heated at relatively low temperatures until the rare-earth oxysulfide phosphor is produced.

47 Claims, 12 Drawing Sheets

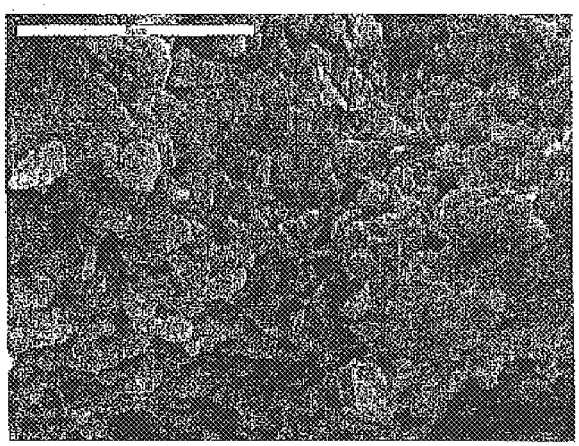 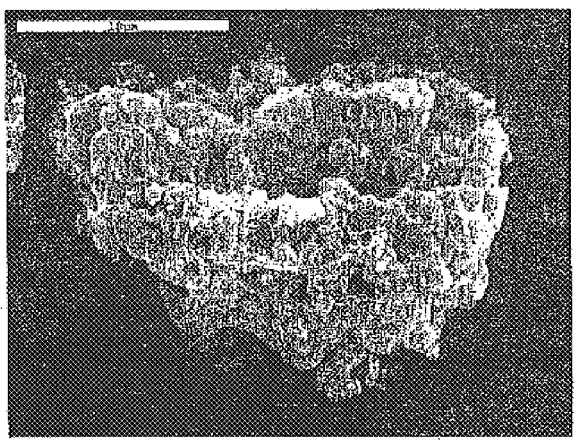
FIG. 1A                    FIG. 1B

METHODS FOR PREPARING RARE-EARTH OXYSULFIDE PHOSPHORS, AND RESULTING MATERIALS

CROSS-REFERENCE TO RELATED APPLICATIONS

This application claims the benefit of U.S. Provisional application No. 60/364,838, filed Mar. 13, 2002.

GOVERNMENT SUPPORT

This invention was made with government support under a grant awarded from DARPA to Georgia Tech under grant number MDA972-93-1-0030 with a subcontract to the University of Florida and administered at the University of Florida under grant number 450947012. The government has certain rights in the invention.

BACKGROUND OF INVENTION

The present invention pertains to advantageous new low temperature processes for synthesizing rare-earth oxysulfide light-emitting phosphors.

Oxysulfide phosphors, which are used in all of the display technologies, are desirable commercial products because of their high luminance efficiency. For example, red, green, and blue emitting phosphors (three different phosphors) are used in every television, computer monitor, and cathode ray tube produced. They are used in electron beams and X-ray digitized image displays. Phosphors are also used in the lighting industry, for example, in fluorescent light bulbs.

Current oxysulfide phosphor synthesis methods produce phosphors with sufficient luminosity, but these processes have significant disadvantages in terms of operating costs and processing time. For example, current methods require process temperatures in excess of 500° C. In one method, process temperatures as high as 1350° C. are reached in production of oxysulfide phosphors. Operating and equipment costs associated with reaching and maintaining temperatures of this magnitude create a need for lower temperature methods of preparation.

In addition, some methods require inert gases such as nitrogen for the reaction environment. The extra equipment for maintenance of the inert atmosphere in addition to the operating expense of buying a specialty gas creates a need for a process utilizing cheaper accessible reactants.

Also, reaction times are frequently an hour or more. Combined with the multiple steps required to prepare, react, and purify the oxysulfide phosphor, the total processing time is often hours. A shorter reaction and processing time is desirable because product may be made more frequently or on short demand time.

Therefore, it is desirable to find a method to produce rare-earth oxysulfide phosphors without the disadvantages of the known methods, thus reducing the operating costs. Because both the display and lighting markets, which deal with consumer items, are very cost competitive, any process that reduces cost will have a huge potential impact.

BRIEF SUMMARY OF THE INVENTION

The present invention provides new and useful methods for preparing rare-earth oxysulfide phosphors. Rare-earth oxysulfide phosphors, materials that emit electromagnetic radiation when excited, are useful in many commercial areas including electronics containing cathode ray tubes and medical devices that utilize X-rays.

Advantageously, in accordance with the methods of the subject invention, rare-earth oxysulfide phosphors can be prepared with lower reaction temperatures and fewer processing steps than methods currently in use.

In a preferred embodiment, the process of the subject invention involves blending two different rare-earth nitrate salts and a sulfidizing agent. After being thoroughly combined, the mixture can be dried to prevent any hydration of the nitrate salts before the combustion step. Then, the mixture is heated in a furnace to the necessary temperature, preferably around 200° C. to 300° C., until the rare-earth oxysulfide phosphor is produced.

If particle sized phosphors are desired, the agglomerated phosphor nodules produced by the process of the subject invention may be ground without compromising the cathodoluminescent efficiency of the phosphor. In addition, an annealing step to increase the photoluminescence of the phosphor may be added. The annealing step can follow the grinding step.

In a specific example, the subject invention provides new and unique methods for preparing oxysulfide phosphors with the general formula $Ln_2O_2S$ (where Ln is scandium, yttrium, lanthanum, cerium, praseodymium, neodymium, promethium, samarium, europium, gadolinium, terbium, dysprosium, holmium, erbium, thulium, ytterbium, lutetium). The phosphors produced according to the subject invention comprise a small amount, typically less than about 5%, of a second Lanthanide Group element that is incorporated within the $Ln_2O_2S$ matrix.

The present invention, operating with a simple procedure at reduced costs in terms of energy, time, and starting materials, results in significant cost savings while producing commercial quality rare-earth oxysulfide phosphors. This invention allows mass production of oxysulfide phosphors; the methods of the subject invention have the following very desirable characteristics:

the short time of reaction and low temperature results in very low energy costs;

the process is simple in comparison with existing processes, and the reaction can be done in the presence of reasonable quantities of oxygen;

many, or all, of the reagents are commercially available;

compounds can be prepared in a few minutes; and the compounds obtained according to the subject invention have a brightness equal to the present commercial products and, in some cases, higher intensity peaks for green or red emission.

BRIEF SUMMARY OF THE FIGURES

FIG. 1 is a scanning electron microscopy photomicrograph of $La_{1.936}Eu_{0.064}O_2S$.

DETAILED DESCRIPTION OF THE INVENTION

Figure 2:
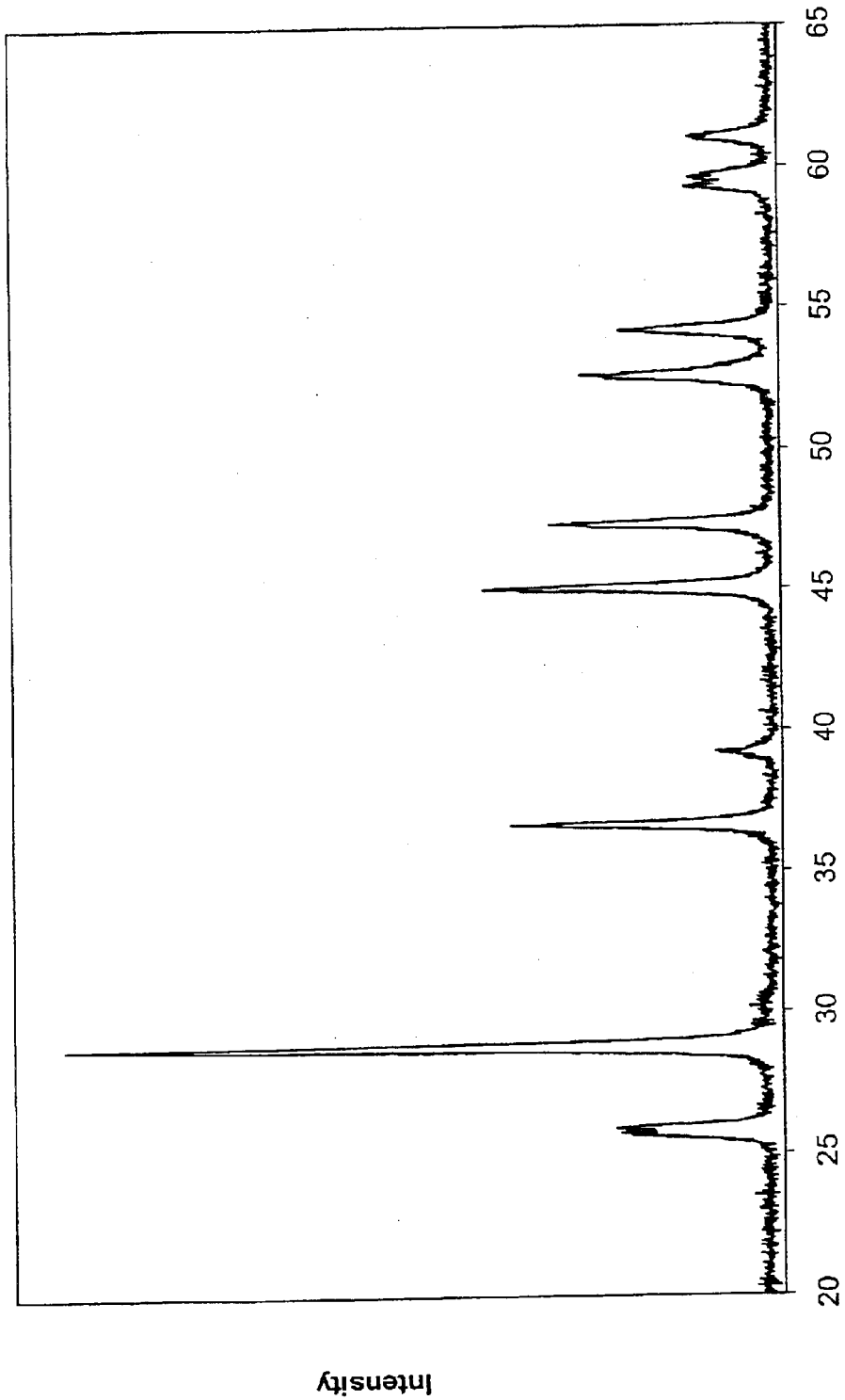
FIG. 2 is an X-ray diffraction spectrum of $La_{1.936}Eu_{0.064}O_2S$.

The present invention provides unique and advantageous processes for manufacturing rare-earth oxysulfide phosphors. Advantageously, the methods or the subject invention for synthesizing rare-earth oxysulfide phosphors reduces the number of steps of production, decreases the energy costs by requiring lower temperatures, and uses commercially available components.

In a preferred embodiment, the oxysulfide phosphous produced according to the subject invention have the general formal $Ln^1_{2-x}Ln^2_xO_2S$, where Ln is a member of the Lanthanide group of elements. The term "Lanthanide" is used herein to denote elements with an atomic number from 57 to 71 (i.e. from lanthanum to lutetium). In a preferred embodiment, the value of x is between about 0.0005 and 0.5. More preferably x is between about 0.001 and 0.1.

A phosphor is a material, which, when excited by electrons, photons, or electric fields, emits electromagnetic radiation. In the present case, the light can be emitted in the visible or infrared regions. These phosphors can be in the form of a solid solution having a matrix of the rare earth oxysulfide compound detailed above but doped with a small amount of an activator dispersed throughout the matrix. The activator is typically also a rare-earth element.

Advantageously, the luminescent phosphors produced according to the subject invention maybe used in a number of applications. Examples of applications of two of these types of phosphors include: production of the red phosphor used in television screens: $Y_2O_2S$:Eu and production for an intensifying screen for X-rays: $Gd_2O_2S$:Tb.

In a preferred embodiment, the rare-earth oxysulfide phosphors are obtained in accordance with the present invention by heating a blend of two different rare-earth nitrate salts and a sulfidizing agent. More specifically, a rare-earth oxysulfide phosphor can be obtained by blending a rare-earth element in its nitrate salt form with a smaller quantity of a different rare-earth nitrate salt. Using techniques known in the art, the two salts are broken into smaller nodules or particles by grinding. An organic sulfidizing agent is blended with the salt mixture followed by additional grinding. Preferably, dithiooxamide is added as an organic sulfidizing agent.

To fabricate the phosphors in accordance with the subject invention, the nitrate and sulfidizing agent blend is heated to temperatures less than 1000° C. Preferably the blend is heated to a temperature between about 200° C. and about 300° C. Most preferably, the blend is heated to around 230° C.

In one embodiment, to inhibit the hydration of either of the rare-earth nitrate salts, the salt and sulfidizing agent blend is dried before combustion occurs. One embodiment utilizes a desiccator as a preferred technique for drying. The drying time will vary depending upon which rare-earth nitrate salts are used, and can be readily determined by a person skilled in the art. As would be appreciated by the skilled artisan, for certain nitrate salts no drying time would be needed but, for other salts, up to around one week of drying may be employed.

The phosphors produced according to the subject invention can be further processed to optimize the physical properties of the phosphors to meet specific market needs. In one embodiment, the phosphor can be ground using techniques known in the art to fracture the phosphors into individual particles without decreasing cathodoluminescence. In another embodiment, the individual particles can undergo an annealing step after the post-combustion grind to increase the photoluminescence of the particles.

Depending on the host lattice and the activator(s), the conditions of the subject method can vary. With the benefit of the teachings provided herein, optimum conditions can be established, by a person skilled in the art, for each combination of rare earth salts. Factors that can be optimized include:

the ratio of sulfidizing agent to nitrate (this ratio varies because of the energy and temperature obtained varies for each reaction); and drying time (varies from no time up to a week or more)— this parameter varies because of the different tendencies for hydration of the nitrate salts of different rare-earth elements.

Following are examples that illustrate procedures for practicing the invention. These examples should not be construed as limiting.

EXAMPLE 1

Preparation of $La_{1.936}Eu0.064O_2S$

To prepare an oxysulfide phosphor with the formula $La_{1.936}Eu_{0.064}O_2S$, which corresponds to doping with 3.2% of europium, the starting compounds shown in Table 1 can be used.

TABLE 1

| | |
|---|---|
| $La(NO_3)3, 6H_2O$ | 8.3833 g |
| $Eu(NO_3)3, 6H_2O$ | 0.2855 g |
| $C_2S_2N_2H_4$ dithiooxamide | 4.8080 g |

In the first step, the nitrate salts of the rare earths can be put in a mortar and ground, producing a good homogeneity of the nitrates. Then, an organic sulfidizing agent, in this case the dithiooxamide ($C_2S_2N_2H_4$), is added to the mixture of nitrates. The mixture is again thoroughly ground (approximately 15 minutes). This mixture is put in a combustion boat in a desiccator for 24 hours. When the mixture is heated in a furnace at 230° C. in air, a highly energetic reaction takes place in only a few seconds.

The very porous oxysulfide of lanthanum obtained is shown by the scanning electron microscopy (SEM) photomicrograph in FIG. 1. The morphology of this powder (FIG. 1) is particulate with an average size under one micrometer. These powder particles are agglomerated into nodules of =10–20 $\mu$m. A post-combustion grinding can be used to break the nodules into individual phosphor particles with a size of, for example, <1 $\mu$m.

The X-ray diffraction (XRD) spectrum shows only $La_2O_2S$, without a presence of any secondary phases (FIG.

Figure 3:
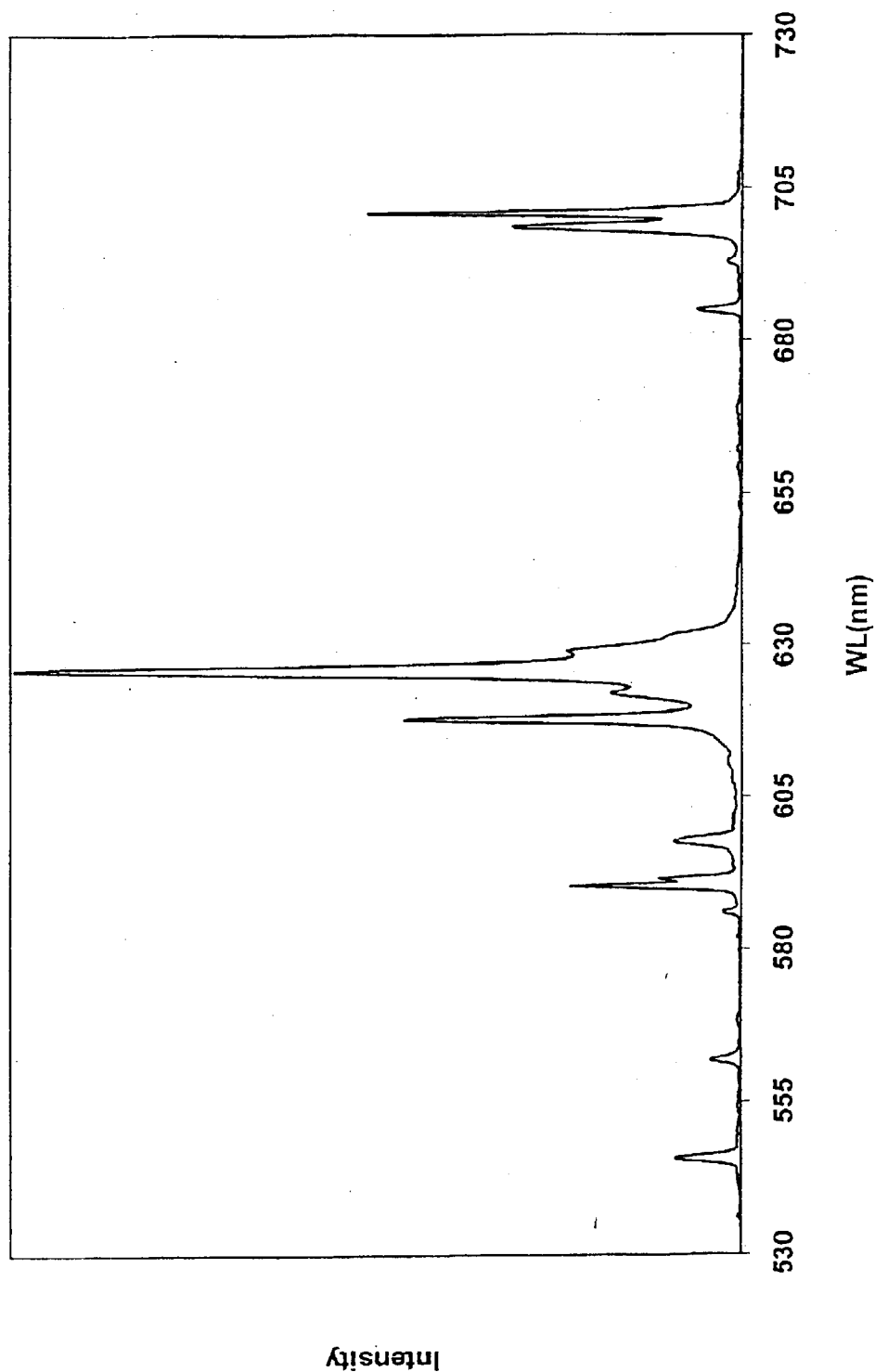
FIG. 3 is a cathodoluminescence spectrum at 2 keV of $La_{1.936}Eu0.064O_2S$.

2). Cathodoluminescence emission has been studied at a voltage of 2 keV, and FIG. 3 shows the emission spectrum. The observed peaks are those expected from phosphors of lanthanum oxysulfide doped with europium, and a red color is observed.

EXAMPLE 2

Preparation of $La_{1.936}Tm_{0.064}O_2S$

For the preparation of a phosphor with the formula $La_{1.936}Tm_{0.064}O_2S$, which corresponds to doping with 3.2% thulium, the starting compounds shown in Table 2 can be used.

TABLE 2

| | |
|---|---|
| $La(NO_3)3, 6H_2O$ | 8.3833 g |
| $Tm(NO_3)3, 5H_2O$ | 0.2848 g |
| $C_2S_2N_2H_4$ dithiooxamide | 4.8080 g |

Figure 4:
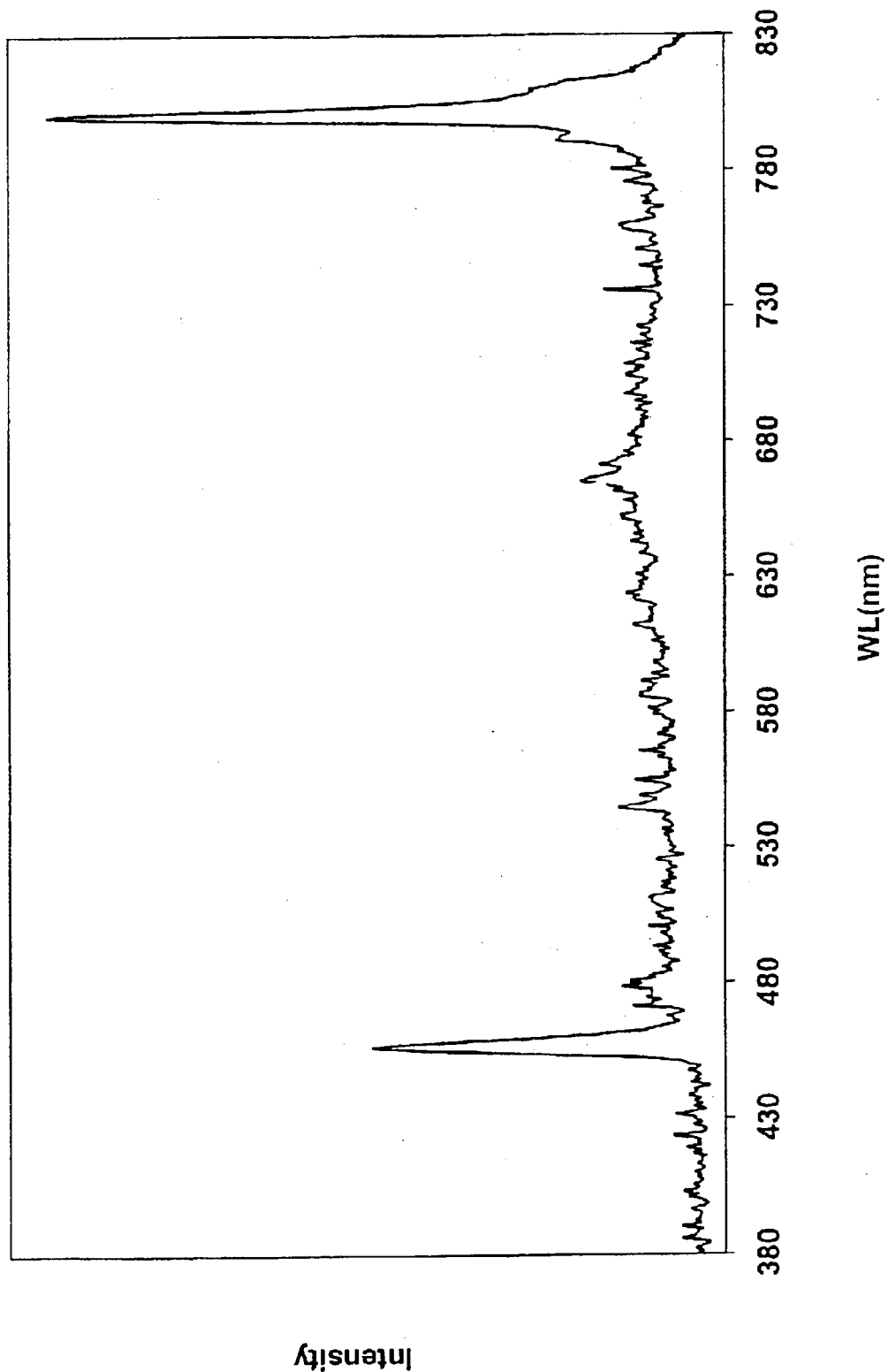
FIG. 4 is a cathodoluminescence spectrum at 2 keV of $La_{1.936}Tm_{0.064}O_2S$.

The method of preparation is exactly the same as in Example 1. FIG. 4 shows the cathodoluminescent emission spectrum for electrons with an energy of 2 keV. The spectrum is that expected from Tm and is dominated by two peaks, one in the blue region at 457 nm, and the second one at 800 nm in the near infrared region.

EXAMPLE 3

Preparation of $Gd_{1.996}Tb_{0.004}O_2S$

For the preparation of a phosphor with the formula $Gd_{1.996}Tb_{0.004}O_2S$, which corresponds to doping with 0.2% terbium, the starting compounds shown in Table 3 can be used.

TABLE 3

| | |
|---|---|
| $Gd(NO_3)3, 6H_2O$ | 9.0089 g |
| $Tb(NO_3)3, 6H_2O$ | 0.0181 g |
| $C_2S_2N_2H_4$ dithiooxamide | 4.8080 g |

Figure 5:
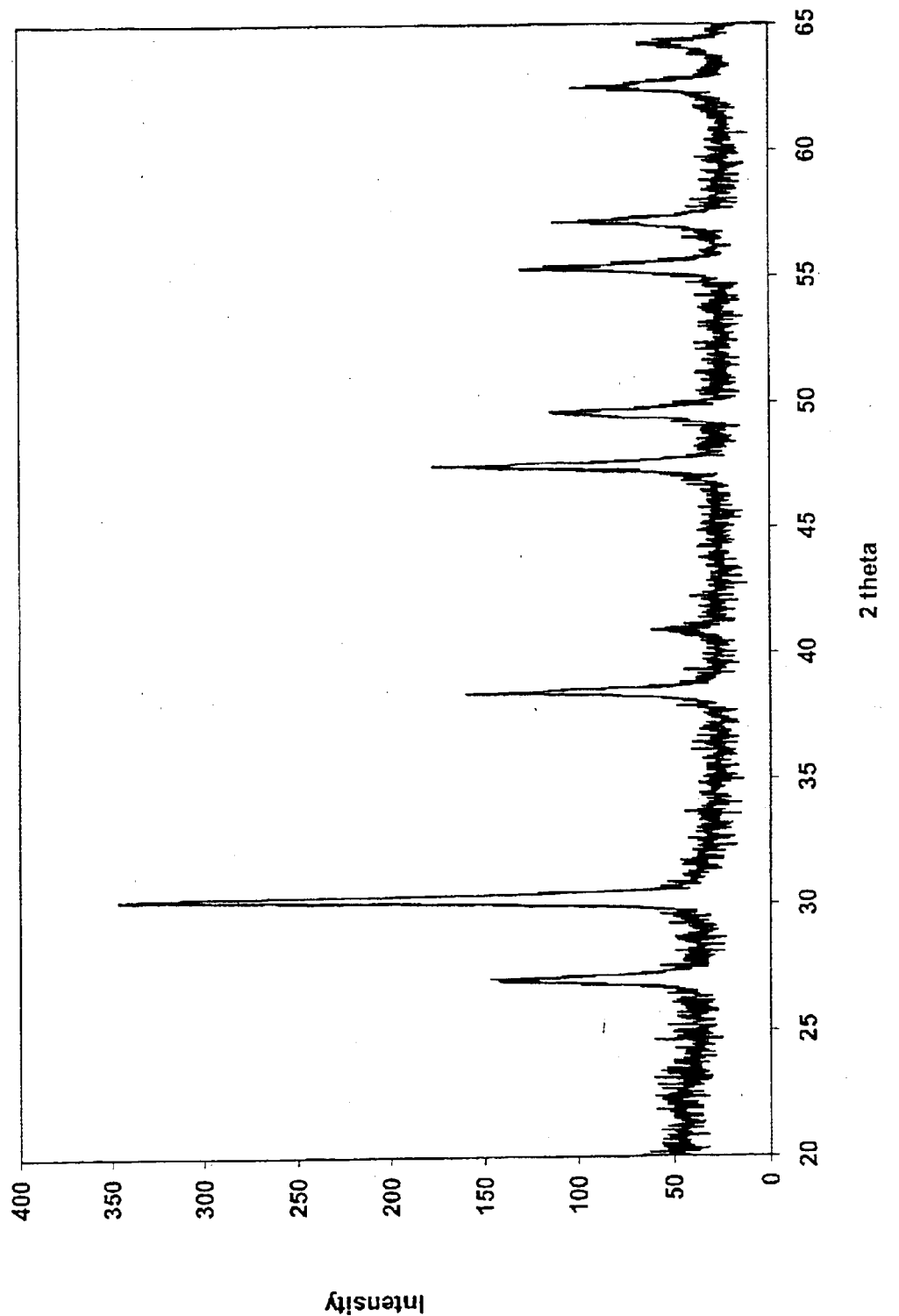
FIG. 5 is an X-ray diffraction spectrum of $Gd_{1.996}Tb_{0.004}O_2S$.

The same process is used as described above, but in this case, the time of drying in the desiccator is increased (to one week) because of the higher tendency of the gadolinium nitrate to hydrate. With longer drying times, a pure oxysulfide of gadolinium is obtained. As characterized by XRD (FIG. 5), only one crystalline phase was formed and it is the expected oxysulfide of gadolinium.

Figure 6:
FIG. 6 is a scanning electron microscopy photomicrograph of $Gd_{1.996}Tb_{0.004}O_2S$.

The powder morphology as imaged in the SEM again shows grain sizes less than one micrometer (FIG. 6).

Figure 7:
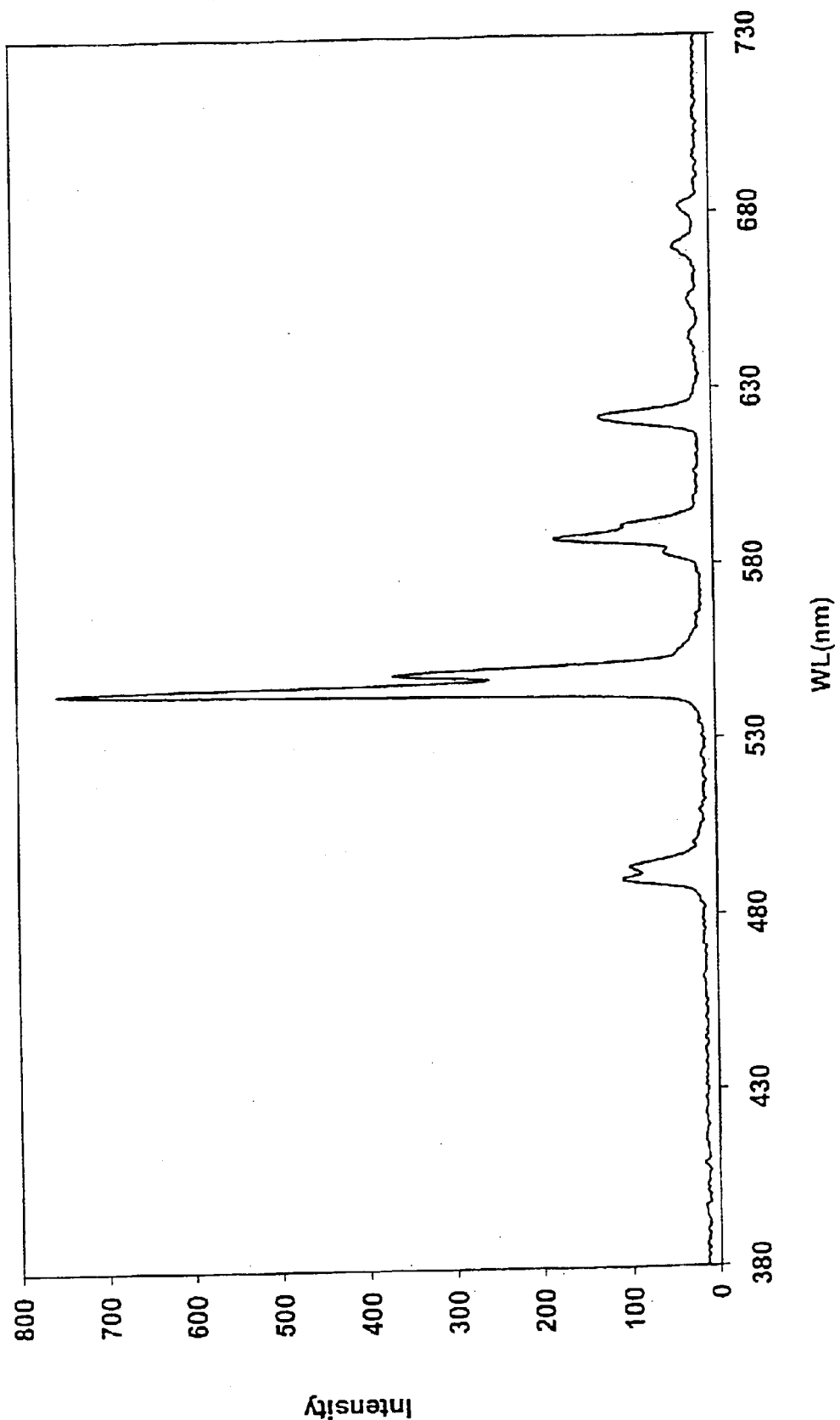
FIG. 7 is a cathodoluminescence spectrum at 2 keV of $Gd_{1.996}Tb_{0.004}O_2S$.

The cathodoluminescent spectrum from excitation with a primary electron bean of 2 keV is shown in FIG. 7. It is that expected from Tb doped gadolinium oxysulfide, i.e., a very bright green emission.

EXAMPLE 4

Preparation of $Y_{1.996}Tb_{0.004}O_2S$

For the preparation of a phosphor with the formula $Y_{1.996}Tb_{0.004}O_2S$, which corresponds to doping by 0.2% terbium, the same method is used. The starting compounds are in Table 4.

TABLE 4

| | |
|---|---|
| $Y(NO_3)3, 6H_2O$ | 7.6849 g |
| $Tb(NO_3)3, 6H_2O$ | 0.0181 g |
| $C_2S_2N_2H_4$ dithiooxamide | 4.3272 g |

Figure 8:
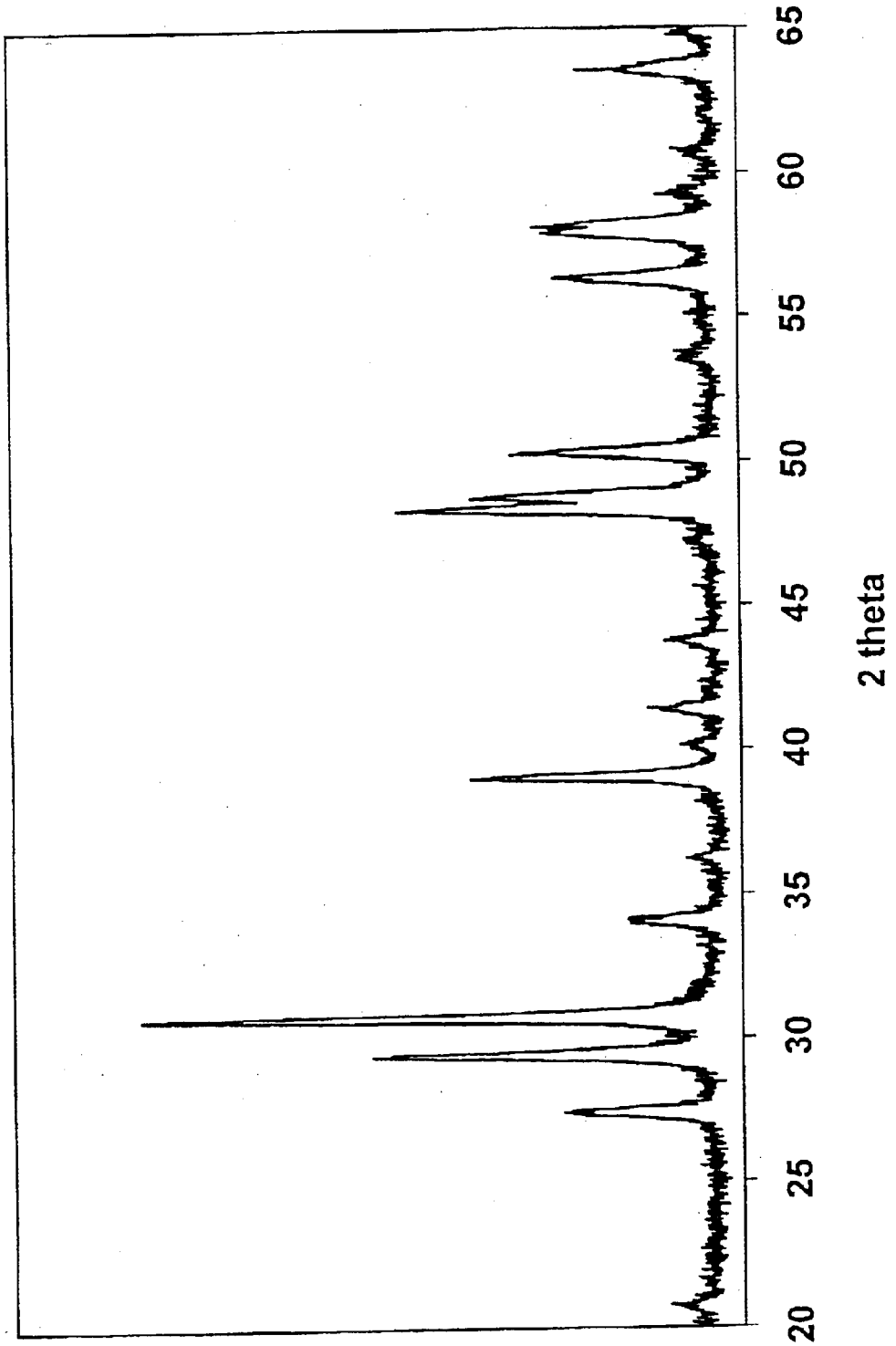
FIG. 8 is an X-ray diffraction spectrum of $Y_{1.996}Tb_{0.004}O_2S$.

In this case the molar ratio of organic sulfidizing agent to rare-earth nitrate is equal to 1.8 in order to reduce the organic residue. The XRD pattern from these powders is shown in FIG. 8, and only the phase of $Y_2O_2S$ was observed.

Figure 9:
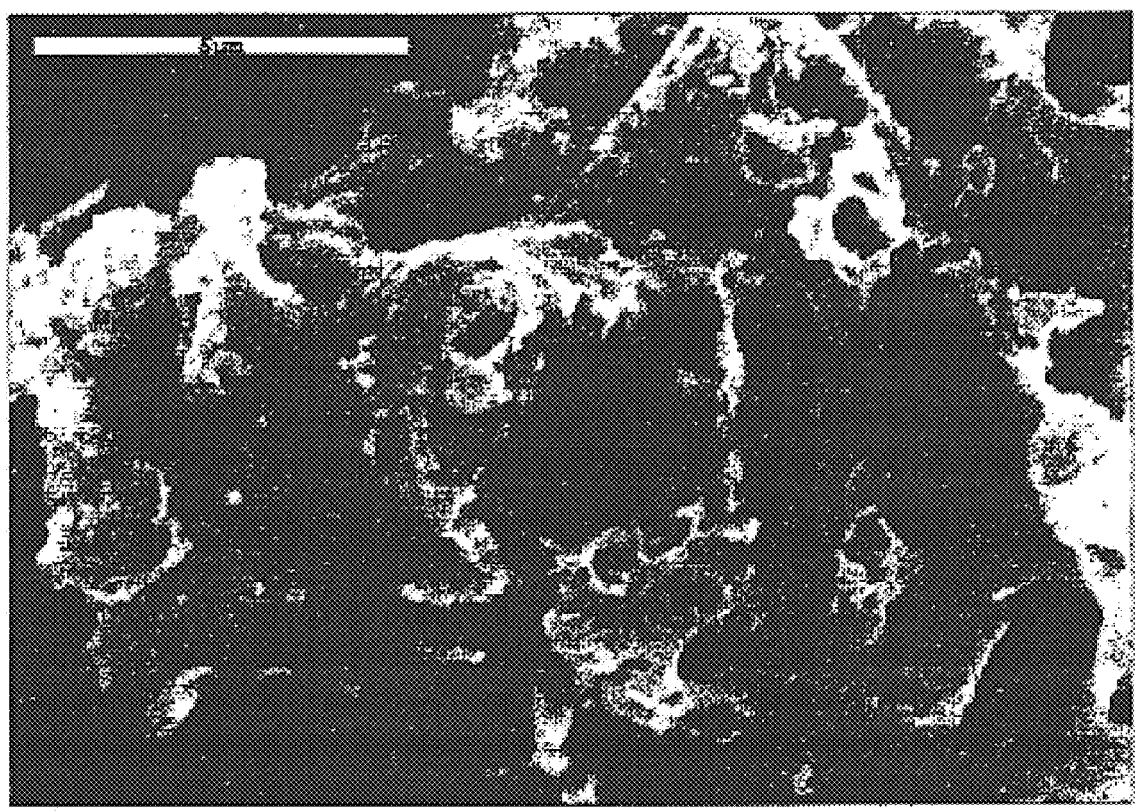
FIG. 9 is a scanning electron microscopy photomicrograph of $Y_{1.996}Tb_{0.004}O_2S$.

The SEM photomicrograph in FIG. 9 shows that the powder particles were again typically under one micrometer.

Figure 10:
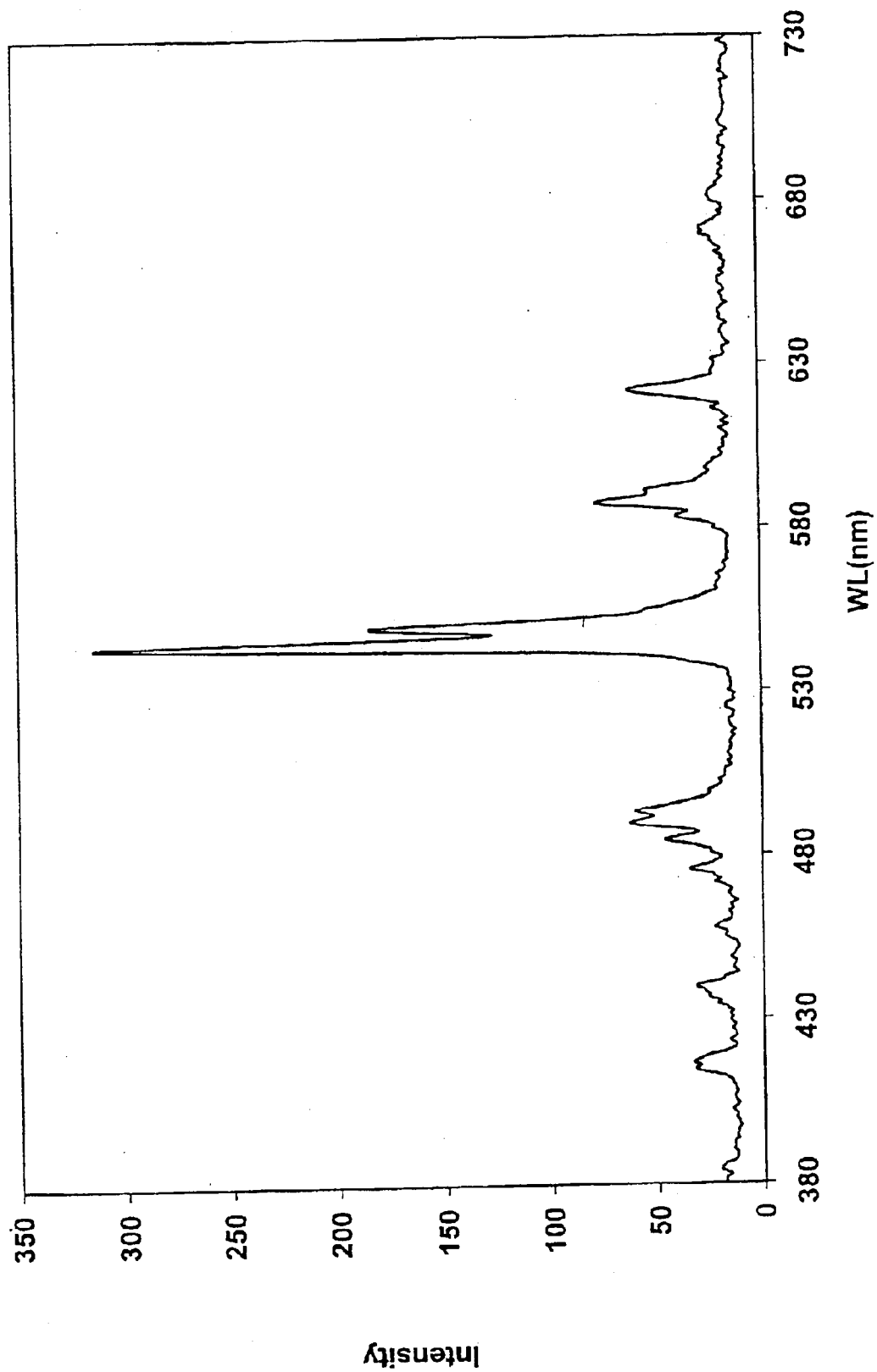
FIG. 10 is a cathodoluminescence spectrum at 2 keV of $Y_{1.996}Tb_{0.004}O_2S$.

Finally, the 2 keV cathodoluminescent spectrum shown in FIG. 10 is that typical for green emission from Tb.

EXAMPLE 5

Emission Intensities for Selected Rare-Earth Oxysulfide Phosphors

Powders of $Ln_2O_2S$ (in this case, Ln=La, Gd, Y) containing luminescent activation centers of either $Eu^{+3}$, $Tb^{+3}$, or $Tm^{+3}$ have been prepared by combustion reactions using metal nitrates and dithiooxoamide $((CSNH_2)_2)$. Their cathodoluminescent properties have been measured versus activator type and concentration, current density, and beam energy. Measurements of the relative peak intensity for $^5D_2 \rightarrow {^7F_4}$ (534 nm) and $^5D_1 \rightarrow {^7F_3}$ (589 nm) to $^5D_0 \rightarrow {^7F_2}$ (627 nm) in $La_2O_2S:Eu^{+3}$ phosphor have shown that at high activator concentration, emissions from high energy levels, ($^5D_2$ and $^5D_1$), are more suppressed than from the low energy level, ($^5D_0$). The $^5D_2 \rightarrow {^5D_0}$ and $^5D_1/^5D_0$ ratios have also been decreased when current density and beam energy were increased. In addition, matrix effects can lead to quenching of Eu emission from $^5D_2$, $^5D_1$, and $^5D_0$ levels and suppression of high energy level emission from Tb oxysulfides.

Figure 11A:
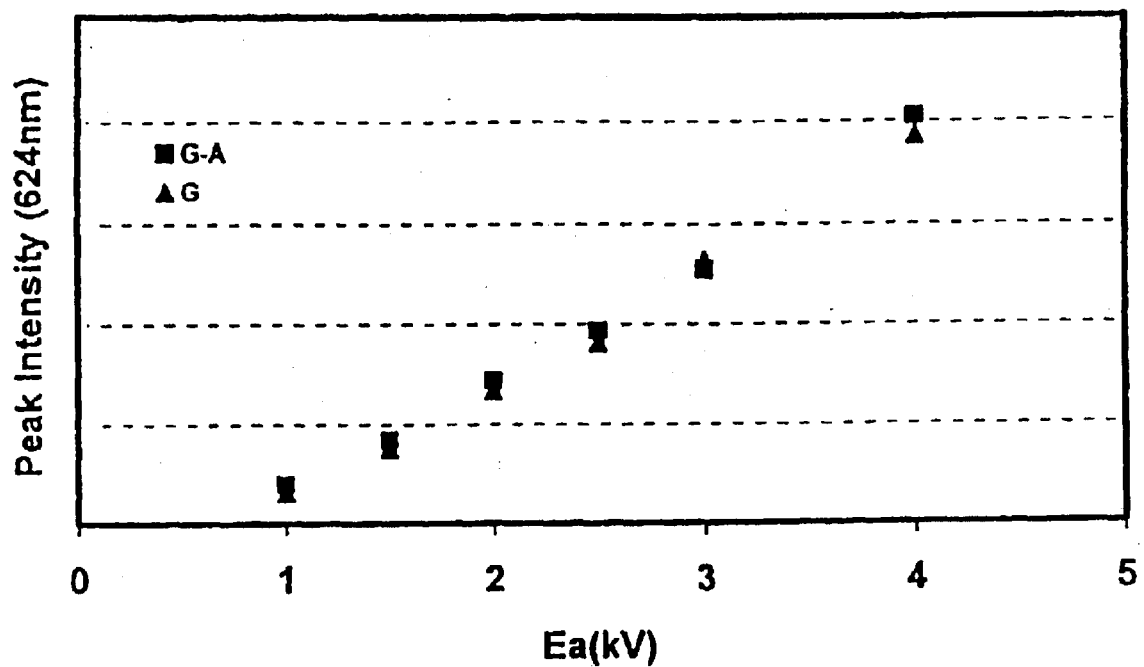
FIG. 11A is a plot comparing the peak intensity of ground $La_{1.936}Eu_{0.064}O_2S$ and ground and annealed $La_{1.936}Eu_{0.064}O_2S$ as a function of voltage.
Figure 11B:
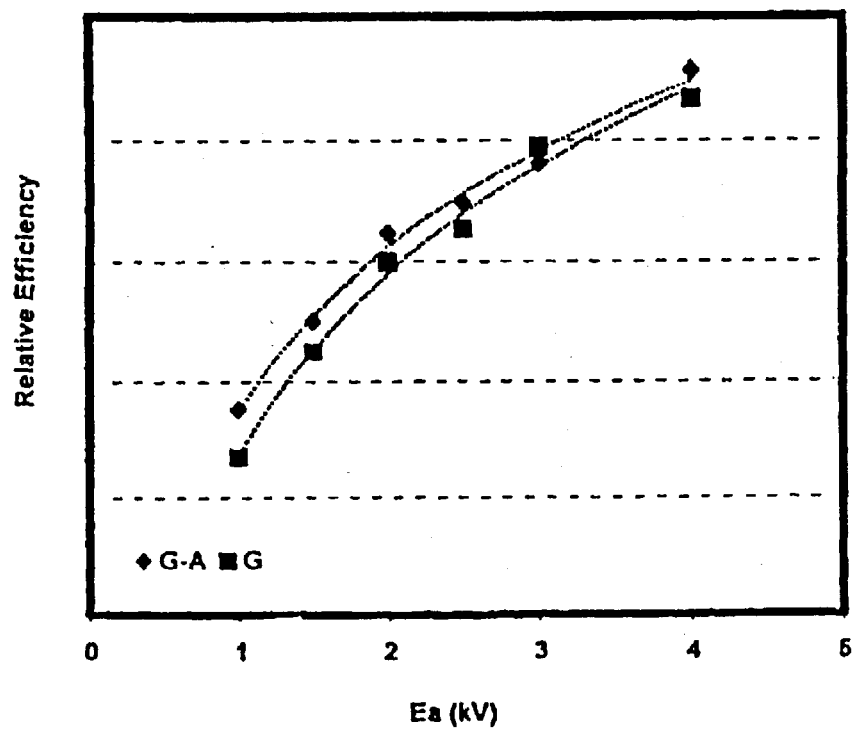
FIG. 11B is a plot comparing the relative efficiency of ground $La_{1.936}Eu_{0.064}O_2S$ and ground and annealed $La_{1.936}Eu_{0.0064}O_2S$ as a function of voltage.
Figure 11C:
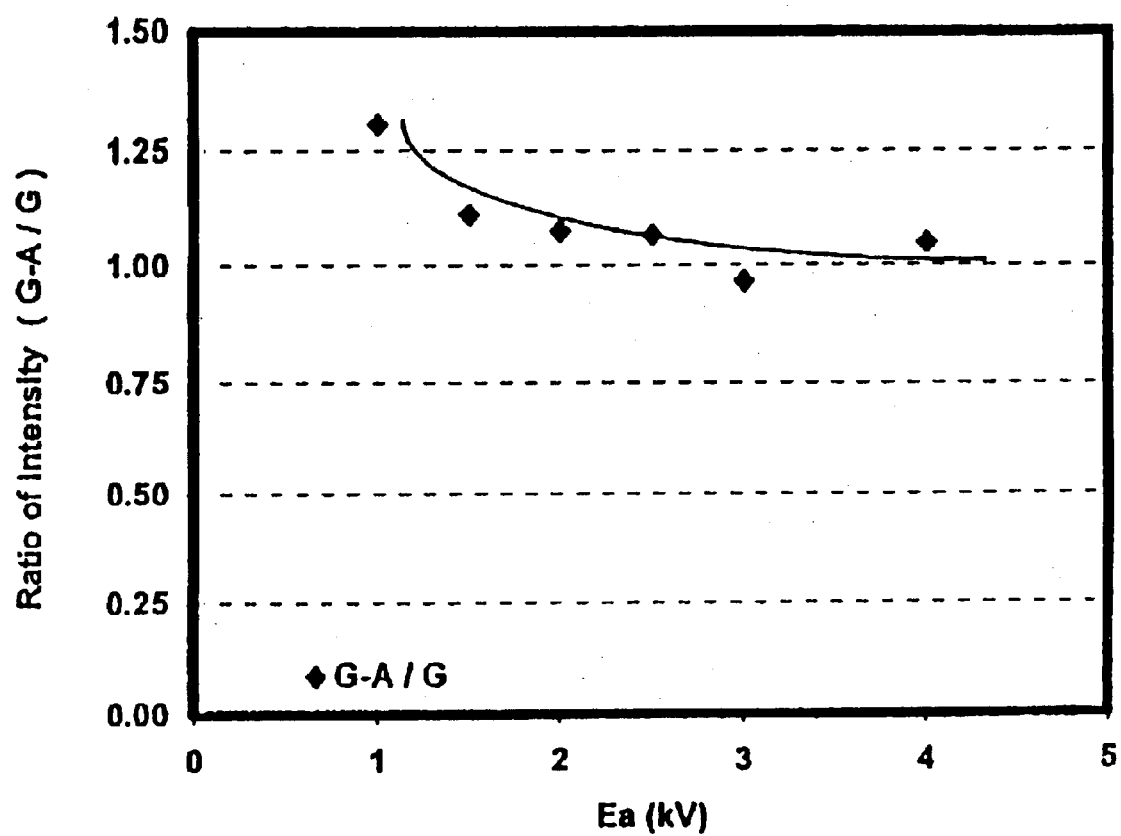
FIG. 11C is a plot of the ratio of ground $La_{1.936}Eu_{0.064}O_2S$ intensity to ground and annealed $La_{1.936}Eu_{0.064}O_2S$ intensity as a function of voltage.

FIGS. 11A–11C show data resulting from grinding the powder to micrometer size particles. This data shows that such grinding does not reduce significantly the cathodoluminescent intensity. This is based on the fact that the intensity and relative efficiency is similar for both ground (G) phosphor and phosphor that has been both ground and annealed (G-A) at 900° C. for 90 minutes (in air).

The emission intensity from the $^5D_2 \rightarrow {^7F_4}$ (534 nm) and $^5D_1 \rightarrow {^7F_3}$ (589 nm) to $^5D_0 \rightarrow {^7F_2}$ (627 nm) luminescent transitions in $Eu^{+3}$ doped $Ln_2O_2S$ (Ln=La, Gd, Y) powder phosphors prepared by combustion reaction have been studied. It has been shown that emissions from high energy levels ($^5D_2$ and $^5D$) are suppressed relative to those from low energy level ($^5D_0$) at higher current density (e.g. 30 vs, 200 uA/cm$^2$) and beam energy (e.g. 2 vs. 5 keV). It has also been shown that the decay of the emitted intensity during electron-beam radiation is greater from $5D_2 \rightarrow {^7F_4}$ (537 nm) and $^5D_1 \rightarrow {^7F_3}$ (586 nm) transition vs. $^5D_0 \rightarrow {^7F_2}$ (624 nm) at a current density of 200 uA/cm$^2$. However, no decay was observed for these transitions at a current density of 30 uA/cm$^2$. These results can be interpreted in terms of perturbations to the energy transfer process (e.g. electrostatic dipole and magnetic dipole interactions) by internal electric fields those are induced by charging, and due to thermal quenching caused by electron-beam heating. In both cases, quenching of emission from higher excited states can be expected at higher current density and beam energy.

It should be understood that the examples and embodiments described herein are for illustrative purposes only and that various modifications or changes in light thereof will be suggested to persons skilled in the art and are to be included within the spirit and purview of this application.

We claim:

1. A method for synthesizing a rare-earth oxysulfide phosphor wherein said method comprises:
   (a) combining a first rare-earth nitrate salt and a second rare-earth nitrate salt;
   (b) adding a sulfidizing agent to said first and second rare-earth nitrate salts, wherein said sulfidizing agent is dithiooxamide ($C_2S_2N_2H_4$); and
   (c) heating the dithiooxamide and nitrate salt blend.

2. The method, according to claim 1, wherein the rare-earth oxysulfide phosphor has the chemical formula $Ln^1_{2-x}Ln^2_xO_2S$; wherein $Ln^1$ and $Ln^2$ are different elements each selected from the group consisting of scandium, yttrium, lanthanum, cerium, praseodymium, neodymium, promethium, samarium, europium, gadolinium, terbium, dysprosium, holmium, erbium, thulium, ytterbium and lutetium; and wherein the value of x is between about 0.0005 to about 0.5.

3. The method, according to claim 1, wherein heating is conducted in a furnace in the presence of air.

4. The method, according to claim 1, wherein the sulfidizing agent and nitrate salt blend is heated to a temperature of less than 1000° C.

5. The method, according to claim 4, wherein the sulfidizing agent and nitrate salt blend is heated to a temperature between about 200° C. and about 300° C.

6. The method, according to claim 5, wherein the sulfidizing agent and nitrate salt blend is heated to a temperature of about 230° C.

7. The method, according to claim 2, wherein the value of x is between about 0.001 and about 0.1.

8. The method, according to claim 1, further comprising a period of drying before heating the dithiooxamide and nitrate salt blend.

9. The method, according to claim 8, wherein the period of drying is sufficient to prevent hydration of the rare-earth nitrate salts.

10. The method, according to claim 1, further comprising grinding the rare-earth oxysulfide phosphor following heating of the dithiooxamide and the nitrate salt blend.

11. The method, according to claim 10, further comprising annealing the ground rare-earth oxysulfide phosphor.

12. The method, according to claim 1, wherein the amount of said first nitrate salt is sufficiently greater than the amount of said second nitrate salt such that a solid solution is formed wherein the rare earth contributed by said first rare-earth nitrate salt forms a lattice and the rare earth contributed by said second rare-earth nitrate salt is dispersed throughout the lattice.

13. The method, according to claim 2, wherein $Ln^1$ is selected from the group consisting of La, Gd and Y; and $Ln^2$ is selected from the group consisting of Eu, Tm and Tb.

14. The method, according to claim 1, used to produce a compound of the formula $La_{2-x}Eu_xO_2S$, wherein the value of x is between about 0.001 and about 0.1.

15. The method, according to claim 1, used to produce a compound of the formula $La_{2-x}Tm_xO_2S$, wherein the value of x is between about 0.001 and about 0.1.

16. The method, according to claim 1, used to produce a compound of the formula $La_{2-x}Tb_xO_2S$, wherein, the value of x is between about 0.001 and about 0.1.

17. A method for synthesizing a rare-earth oxysulfide phosphor wherein said method comprises:
   (a) combining a first rare-earth nitrate salt and a second rare-earth nitrate salt;
   (b) adding a sulfidizing agent to said first and second rare-earth nitrate salts; and
   (c) heating the sulfidizing agent and nitrate salt blend to about 200° C. to about 300° C.

18. The method, according to claim 17, wherein the rare-earth oxysulfide phosphor has the chemical formula $Ln^1_{2-x}Ln^2_xO_2S$; and wherein $Ln^1$ and $Ln^2$ are different elements each selected from the group consisting of scandium, yttrium, lanthanum, cerium, praseodymium, neodymium, promethium, samarium, europium, gadolinium, terbium, dysprosium, holmium, erbium, thulium, ytterbium and lutetium; wherein the value of x is between about 0.0005 and about 0.5.

19. The method, according to claim 18, wherein the value of x is between about 0.001 and about 0.1.

20. The method, according to claim 17, wherein the sulfidizing agent is dithiooxamide ($C_2S_2N_2H_4$).

21. The method, according to claim 17, wherein heating is conducted in a furnace in the presence of air.

22. The method, according to claim 17, wherein the sulfidizing agent and nitrate salt blend is heated to about 230° C.

23. The method, according to claim 17, further comprising a period of drying before heating the sulfidizing agent and nitrate salt blend.

24. The method, according to claim 23, wherein the period of drying is sufficient to prevent hydration of the rare-earth nitrate salts.

25. The method, according to claim 17, further comprising grinding the rare-earth phosphate following heating of the sulfidizing agent and the nitrate salt blend.

26. The method, according to claim 17, further comprising annealing the ground rare-earth oxysulfide phosphor.

27. The method, according to claim 17, wherein the amount of said first rare-earth nitrate salt is sufficiently greater than the amount of said second rare-earth nitrate salt such that a solid solution is formed wherein the rare earth contributed by said first rare-earth nitrate salt forms a lattice and the rare earth contributed by said second rare-earth nitrate salt is dispersed through the lattice.

28. The method, according to claim 17, used to produce a compound of the formula $La_{2-x}Eu_xO_2S$, wherein the value of x is between about 0.001 and about 0.1.

29. The method, according to claim 17, used to produce a compound of the formula $La_{2-x}Tm_xO_2S$, wherein the value of x is between about 0.001 and about 0.1.

30. The method, according to claim 17, used to produce a compound of the formula $La_{2-x}Tb_xO_2S$, wherein the value of x is between about 0.001 and about 0.1.

31. The method, according to claim 18, wherein $Ln^1$ is selected from the group consisting of La, Gd, and Y; and $Ln^2$ is selected from the group consisting of Eu, Tm, and Tb.

32. A method for synthesizing a rare-earth oxysulfide phosphor wherein said method comprises:
   (a) combining a first rare-earth nitrate salt and a second rare-earth nitrate salt;
   (b) adding a sulfidizing agent to said first and second rare-earth nitrate salts;
   (c) drying the sulfidizing agent and nitrate salt blend; and
   (d) heating the sulfidizing agent and nitrate salt blend.

33. The method, according to claim 32, wherein the rare-earth oxysulfide phosphor has the chemical formula $Ln^1_{2-x}Ln^2_xO_2S$; wherein $Ln^1$ and $Ln^2$ are different elements each selected from the group consisting of scandium, yttrium, lanthanum, cerium, praseodymium, neodymium, promethium, samarium, europium, gadolinium, terbium, dysprosium, holmium, erbium, thulium, ytterbium and lutetium; and wherein the value of x is between, about 0.0005 and about 0.5.

34. The method, according to claim 33, wherein the value of x is between about 0.001 and about 0.1.

35. The method, according to claim 32, wherein the sulfidizing agent is dithiooxamide ($C_2S_2N_2H_4$).

36. The method, according to claim 32, wherein heating is conducted in a furnace in the presence of air.

37. The method, according to claim 32, wherein the sulfidizing agent and nitrate salt blend is heated to a temperature of less than 1000° C.

38. The method, according to claim 32, wherein the sulfidizing agent and nitrate salt blend is heated to a temperature between about 200° C. and about 300° C.

39. The method, according to claim 38, wherein the sulfidizing agent and nitrate salt blend is heated to a temperature is about 230° C.

40. The method, according to claim 32, wherein the drying period is sufficient to prevent hydration of the rare-earth nitrate salts.

41. The method, according to claim 32, further comprising grinding the rare-earth oxysulfide phosphor following beating of the sulfidizing agent and nitrate salt blend.

42. The method, according to claim 41, further comprising annealing the ground rare-earth oxysulfide phosphor.

43. The method, according to claim 32, wherein the amount of said first rare-earth nitrate salt is sufficiently greater than the amount of said second rare-earth nitrate salt such that a solid solution is formed wherein the rare earth contributed by said first rare-earth nitrate salt forms a lattice and the rare earth contributed by said second rare-earth nitrate salt is dispersed through the lattice.

44. The method, according to claim 32, used to produce a compound of the formula $La_{2-x}Eu_xO_2S$, wherein the value of x is between about 0.001 and about 0.1.

45. The method, according to claim 32, used to produce a compound of the formula $La_{2-x}Tm_xO_2S$, wherein the value of x is between about 0.001 and about 0.1.

46. The method, according to claim 32, used to produce a compound of the formula $La_{2-x}Tb_xO_2S$, wherein the value of x is between about 0.001 and about 0.1.

47. The method, according to claim 32, wherein $La^1$ is selected from the group consisting of La, Gd, and Y; and $Ln^2$ is selected from the group consisting of Eu, Tm, and Tb.

* * * * *

UNITED STATES PATENT AND TRADEMARK OFFICE
CERTIFICATE OF CORRECTION

PATENT NO. : 6,843,938 B2
DATED : January 18, 2005
INVENTOR(S) : Holloway et al.

It is certified that error appears in the above-identified patent and that said Letters Patent is hereby corrected as shown below:

Column 2,
Line 56, "Eu0.064O$_2$S" should read -- Eu$_{0.064}$O$_2$S --.

Column 4,
Line 36, "Eu0.064O$_2$S" should read -- Eu$_{0.064}$O$_2$S --.

Column 6,
Line 55, "5D$_2$→$^7$F$_4$" should read -- $^5$D$_2$→$^7$F$_4$ --.

Signed and Sealed this

Thirty-first Day of May, 2005

JON W. DUDAS
*Director of the United States Patent and Trademark Office*